US008855501B2

(12) United States Patent
Xie

(10) Patent No.: US 8,855,501 B2
(45) Date of Patent: Oct. 7, 2014

(54) METHOD FOR CARRIER FREQUENCY RECOVERY AND OPTICAL INTRADYNE COHERENT RECEIVER

(75) Inventor: Changsong Xie, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 267 days.

(21) Appl. No.: 13/328,384

(22) Filed: Dec. 16, 2011

(65) Prior Publication Data

US 2012/0087680 A1 Apr. 12, 2012

Related U.S. Application Data

(63) Continuation of application No. PCT/CN2009/072319, filed on Jun. 17, 2009.

(51) Int. Cl.
*H04B 10/06* (2006.01)
*H04B 10/61* (2013.01)
*H04B 10/60* (2013.01)

(52) U.S. Cl.
CPC ........ *H04B 10/6161* (2013.01); *H04B 10/6164* (2013.01); *H04B 10/6162* (2013.01); *H04B 10/60* (2013.01); *H04B 10/611* (2013.01)
USPC ............................. 398/202; 398/203; 398/204

(58) Field of Classification Search
USPC ................................. 398/202–208
See application file for complete search history.

(56) References Cited

U.S. PATENT DOCUMENTS

| 6,647,025 B1 | 11/2003 | Sudo | |
| 7,522,841 B2 * | 4/2009 | Bontu et al. | 398/154 |
| 7,899,340 B1 * | 3/2011 | Bontu et al. | 398/209 |
| 8,095,019 B2 * | 1/2012 | Kaneda et al. | 398/208 |
| 2004/0091066 A1 | 5/2004 | Noe | |
| 2006/0245766 A1 | 11/2006 | Taylor | |
| 2008/0095250 A1 | 4/2008 | Kim et al. | |
| 2008/0152362 A1 | 6/2008 | Koc | |

(Continued)

FOREIGN PATENT DOCUMENTS

| CN | 1261228 A | 7/2000 |
| CN | 101453269 A | 6/2009 |
| WO | WO 2007/117525 A2 | 10/2007 |
| WO | WO 2008088522 A1 | 7/2008 |

OTHER PUBLICATIONS

International Search Report and Written Opinion of the International Searching Authority issued in corresponding PCT Patent Application No. PCT/CN2009/072319, mailed Mar. 25, 2010.

(Continued)

*Primary Examiner* — Dzung Tran
(74) *Attorney, Agent, or Firm* — Brinks Gilson & Lione

(57) ABSTRACT

A method for carrier frequency recovery in an optical coherent transmission system is provided in which at least one kind of equalization of a received signal is performed in frequency domain, the method comprising: performing a frequency offset compensation in frequency domain on a received signal according to an estimated value of the frequency offset; obtaining the signal with the frequency offset compensated. Further, an optical coherent receiver is provided comprising: an equalization unit, adapted to perform at least one kind of optical distortion compensation of a received signal in frequency domain; a frequency offset compensation unit, adapted to perform the frequency offset compensation in frequency domain on a received signal according to an estimated value of the frequency offset to obtain the signal with frequency offset compensated.

6 Claims, 5 Drawing Sheets

(56) References Cited

U.S. PATENT DOCUMENTS

| | | | |
|---|---|---|---|
| 2008/0205905 A1 | | 8/2008 | Tao et al. |
| 2009/0142076 A1 | | 6/2009 | Li et al. |
| 2009/0142077 A1 | * | 6/2009 | Taylor ............................ 398/208 |
| 2011/0064421 A1 | * | 3/2011 | Zhang et al. .................. 398/208 |
| 2011/0305453 A1 | * | 12/2011 | Hauske et al. .................. 398/38 |

OTHER PUBLICATIONS

Savory, "Digital Filters for Coherent Optical Receivers" Optics Express, vol. 16 No. 2, Jan. 21, 2008.

Tao et al., "Multiplier-Free Phase for Recovery for Optical Coherent Receivers" PFC/NFOEC 2008.

Li et al., "Wide-range, Accurate and Simple Digital Frequency Offset Compensator for Optical Coherent Receivers" OFC/NFOEC 2008.

Extended European Search Report issued in corresponding European Patent Application No. 09845989.4, mailed Jul. 18, 2012.

Ip et al., "Digital Equalization of Chromatic Dispersion and Polarization Mode Dispersion" Journal of Lightwave Technology, vol. 25, No. 8, Aug. 2007.

Ishihara et al., "Frequency-Domain Equalisation for Optical Transmission Systems" Electronic Letters, vol. 44, No. 14, Jul. 3, 2008.

Li et al., "Wide-Range Accurate and Simple Digital Frequency Offset Compensator for Optical Coherent Receivers" OFC/NFOEC, IEEE 2008.

Savory, "Digital Filters for Coherent Optical Receivers" Optics Express vol. 16, No. 2, Jan. 21, 2008. XP-007906766.

Tao et al., "Multiplier-Free Phase Recovery for Optical Coherent Receivers" OFC/NFOEC, IEEE 2008.

* cited by examiner

METHOD FOR CARRIER FREQUENCY RECOVERY AND OPTICAL INTRADYNE COHERENT RECEIVER

CROSS-REFERENCE TO RELATED APPLICATIONS

The application claims the benefit of priority to International Patent Application No. PCT/CN2009/072319, filed on Jun. 17, 2009, and entitled "METHOD FOR CARRIER FREQUENCY RECOVERY AND OPTICAL INTRADYNE COHERENT RECEIVER", which is incorporated herein by reference in their entireties.

FIELD OF THE INVENTION

The present invention relates to signal reception, particular to signal reception with coherent detection in a high speed optical transmission.

BACKGROUND

The statements in this section merely provide background information related to the present disclosure and may not necessarily constitute prior art.

Optical coherent transmission attracts more and more interests for its higher performance over direct detection. In intradyne coherent optical transmission, the local laser at the receiver side may not be able to track the frequency of the laser at the transmitter side. So a carrier frequency offset occurs between both sides. This frequency offset results in a middle-frequent envelop upon the received signal. This effect should be compensated using digital signal processing (DSP) algorithm, in the receiver.

In the existing art (see for example Prior Art Documents [1], [2], [3], [4] and [5]), the solution to compensate the carrier frequency offset is at first to estimate the frequency offset and convert the frequency offset to phase offset of each sampled signal, then rotate the signal with the estimated phase in the contrary direction. According to Prior Art Document [1] the frequency offset is compensated through inverse rotation of the signal. The inverse rotation is implemented in the time domain. For each sample signal, according to the latter document the inverse rotation needs 4 real number multiplications, 3 addition, 1 modulo operation, 1 shifting operation to be performed.

However, optical communication has large capacity, for example 40 Gbit/s and above. Even if quadrature phase shift keying (QPSK) plus polarization multiplexing is employed, the symbol rate is still as high as 10 Gsymbol/s. With such high speed, even a simple multiplier turns to be a challenge for DSP. Prior Art Document [5] discloses a pre-decision phase recovery for optical QPSK coherent receivers. The proposed method only uses adder, subtractor, look up table, and some logical circuit, but no multiplier. Compared with conventional 4th power method developed by Viterbi and Viterbi this method according to Prior Art Document [5] requires reduced calculation time. However, in practice it seems not to be easy to implement a simple receiver using such method.

In addition to the carrier frequency offset, optical dispersion of the fiber causes the transmitting signal being distorted. The receiver must compensate the distortion to improve the signal quality to be correctly detected. Therefore in optical signal reception systems equalization of optical reception signals is performed. Such equalization can for example be chromatic dispersion compensation in order to compensate chromatic dispersion and/or polarization mode dispersion compensation applied to equalize polarization mode dispersion. In the existing art like Prior Art Document [6], compensation of frequency offset and one ore more types of equalization including for example compensation of chromatic dispersion are performed independently. According to Prior Art Document [6] in order to perform optical distortion compensation filtering can be performed in the time domain or using fast convolution techniques in the frequency domain in order to minimize the overall DSP complexity. I.e., even if filtering in frequency domain requires performing convolution like Fast Fourier Transform (FFT) and additionally inverse convolution like Inverse Fast Fourier Transform (IFFT), depending on the filtering method such filtering in frequency domain can require less calculation effort than performing a required filtering in time domain.

Performing several complicated compensations involves a complex receiver structure.

Prior Art Documents

[1] Digital phase estimator, digital phase locked loop and optical coherent receiver, United States Patent Application Publication, No.: US 2008/0205905, Aug. 28, 2008;

[2] Apparatus and method for a carrier recovery, United States Patent Application Publication, No.: US 2004/0091066, May 13, 2004;

[3] Phase estimation for coherent optical detection, United States Patent Application Publication, No.: US 2006/0245766, Nov. 2, 2006;

[4] Wide-range, accurate and simple digital frequency offset compensator for optical coherent receivers, OFC 2008;

[5] Multiplier-free phase recovery for optical coherent receivers, OFC 2008;

[6] Digital filters for coherent optical receivers, OPTICS EXPRESS, January 2008, Vol. 16, No. 2, pp. 804-817.

SUMMARY

It is therefore a goal of the present invention to provide a solution for signal reception with coherent detection in a high speed optical transmission requiring lower complexity in optical coherent receivers.

This summary discloses several aspects and implementation forms of the present invention according to which the above mentioned goal can be achieved, respectively.

According to a first aspect of the present invention, a method is provided for carrier recovery in an optical coherent transmission system, in which at least one kind of equalization of a received signal is performed in frequency domain, wherein the method includes:

performing a carrier frequency offset compensation in frequency domain on a received signal according to an estimated value of the frequency offset;

obtaining the signal with frequency offset compensated.

In order to transform the received signal into the frequency domain and in order to transform the frequency offset compensated signal into time domain several convolution processes and inverse convolution processes are known to a person skilled in the related art. Those processes include Fourier Transform (FT) including Fast Fourier Transform (FFT) and Inverse Fourier Transform (IFT) including Inverse Fast Fourier Transform (IFFT). Therefore, according to one implementation form of this first aspect performing a frequency offset compensation in frequency domain on a received signal according to an estimated value of the frequency offset may further include:

carrying out a Fourier Transform, FT, on the signal to obtain a first spectrum of the signal;

shifting the first spectrum of the signal by the estimated value of the frequency offset to obtain a second spectrum of the signal in the frequency domain;

carrying out an Inverse Fourier Transform, IFT, on the signal with the second spectrum.

According to one particular implementation form according to the first aspect the equalization is performed in frequency domain after performing a carrier frequency offset compensation in frequency domain. In such an embodiment, as equalization is performed on the carrier frequency offset compensated signal an increase of performance of equalization is enabled.

According to one particular implementation form according to the first aspect the equalization comprises polarization mode dispersion compensation and chromatic dispersion compensation.

According to another particular implementation form according to the first aspect the equalization comprises chromatic dispersion compensation.

According to another particular implementation form according to the first aspect the equalization comprises polarization mode dispersion compensation and chromatic dispersion compensation. According to a specific implementation form of the latter, the equalization comprises both polarization mode dispersion compensation and chromatic dispersion compensation and polarization mode dispersion compensation is performed after chromatic dispersion compensation. In such an embodiment, as polarization mode dispersion compensation is performed on the signal having chromatic dispersion compensated an increase of performance of polarization mode dispersion compensation is enabled. As mentioned above, the performance of both, chromatic dispersion compensation and polarization mode dispersion compensation can under certain circumstances be even more increased if chromatic dispersion compensation is performed in frequency domain after performing a carrier frequency offset compensation in frequency domain and polarization mode dispersion compensation is performed in frequency domain after performing chromatic dispersion compensation.

According to a second aspect of the present invention, Optical coherent receiver is provided, comprising: an equalization unit, adapted to perform at least one kind of optical distortion compensation of a received signal in frequency domain; and a frequency offset compensation unit, adapted to perform the frequency offset compensation in frequency domain on a received signal according to an estimated value of the frequency offset to obtain the signal with frequency offset compensated.

According to one particular implementation form according to the second aspect the receiver further comprises: a Fourier Transform, FT, unit, adapted to carry out Fourier Transform, FT, on the signal to obtain a first spectrum of the signal; and an Inverse Fourier Transform, IFT, unit, adapted to carry out an Inverse Fourier Transform, IFT, on the signal with the second spectrum.

According to a specific one of the latter implementation form the equalization unit performs optical distortion compensation on the signal with the second spectrum before sending the signal to the IFT unit.

According to another particular implementation form according to the second aspect the receiver comprises as frequency offset compensation unit a frequency shift unit, adapted to shift the first spectrum of the signal by the estimated value of the frequency offset.

According to another particular implementation form according to the second aspect the equalization unit comprises a polarization mode dispersion compensation unit adapted to perform polarization mode dispersion compensation.

According to another particular implementation form according to the second aspect the equalization unit comprises a chromatic dispersion compensation unit adapted to perform chromatic dispersion compensation.

According to another particular implementation form according to the second aspect the equalization unit comprises a polarization mode dispersion compensation unit adapted to perform polarization mode dispersion compensation and a chromatic dispersion compensation unit adapted to perform chromatic dispersion compensation.

According to a specific one of the latter implementation form the polarization mode dispersion compensation unit is adapted to perform polarization mode dispersion compensation after chromatic dispersion compensation has been performed.

BRIEF DESCRIPTION OF THE DRAWING(S)

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments. In the Figures as one example of an equalization unit a chromatic dispersion compensation unit is shown. This chromatic dispersion compensation unit is however just one example and can be replaced by any equalization unit performing any dispersion compensation on an optical signal like chromatic dispersion compensation, polarization mode dispersion compensation or both of them. Further, even if not shown in the figures, in some embodiments additional dispersion compensation units can be arranged in both, the frequency domain and/or the time domain at other locations in the signal flow.

According to exemplary embodiments of the present invention, a method for carrier frequency recovery in optical transmission and an digital optical coherent receiver are provided, which performs frequency offset compensation in the frequency domain on a signal received according to an estimated value of the frequency offset to obtain the signal with the frequency offset compensated.

For sampled signals, only shifting the spectrum of a block of sampled signals is needed to compensate the frequency offset. That is to say, only a few shift operations are needed instead of 4 multiplications, 3 additions, 1 modulo operation, 1 shift operation for just one sample as in the existing art. Compensating frequency offset by shifting the spectrum will reduce the computation complexity dramatically compared to traditional method. The processing is speed up and the resources needed are very much saved.

Further, equalization like one or both of chromatic dispersion compensation and polarization mode dispersion compensation may be performed on the signal after or before performing the frequency offset compensation in the frequency domain, wherein even one of the mentioned kinds of equalization on the signal may be performed in the time domain. Thus the signal output is both frequency offset and optical dispersion compensated.

Figure 1:
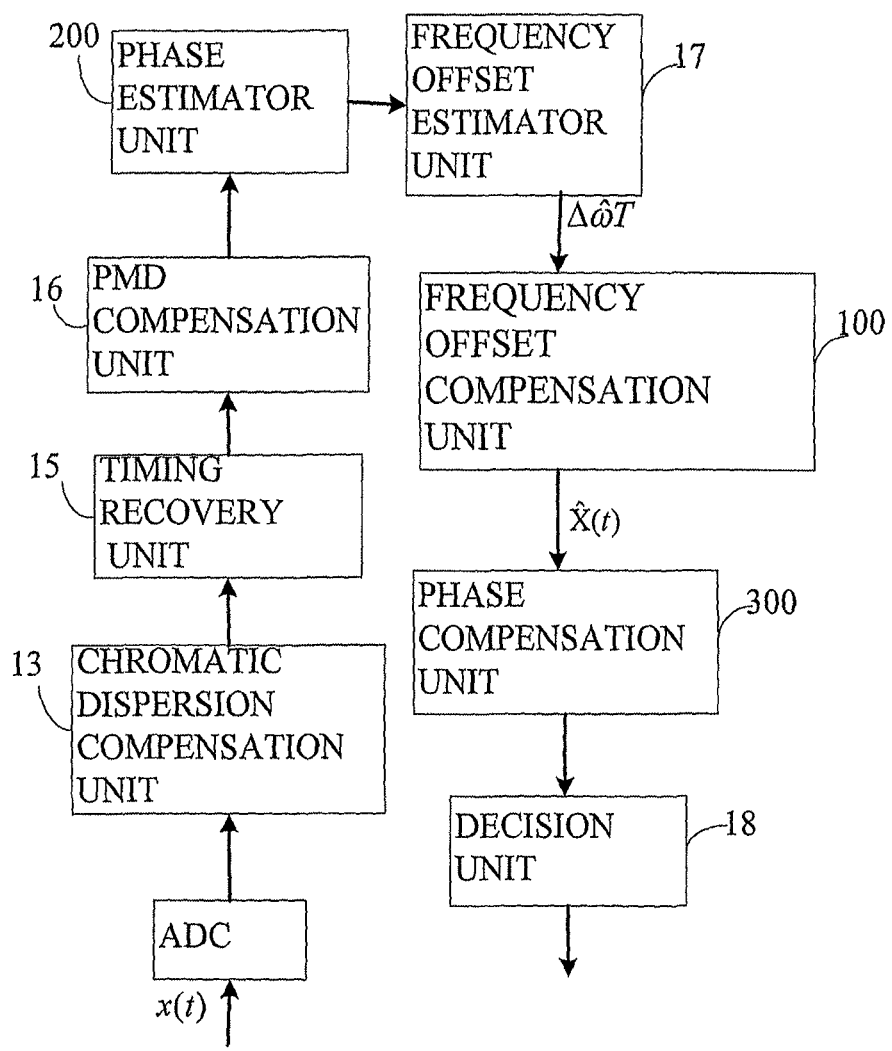
FIG. 1 is a structure diagram of an optical coherent receiver of the prior art.

FIG. 1 shows a structure diagram of an optical coherent receiver of the prior art.

Suppose the optical coherent receiver receives a down-converted signal with frequency offset, the signal is x(t), having the spectrum $X(\omega)$. The flow of the optical coherent receiver's process may be as following:

A Chromatic Dispersion Compensation unit 13 receives the signal, performs chromatic dispersion compensation on the signal, outputs the signal to a timing recovery unit 15; the timing recovery unit 15 performs clock synchronization to the signal with chromatic dispersion compensated, but still with the frequency offset; a PMD compensation unit 16 obtains the signal from the timing recovery unit 15, performs PMD compensation to the signal with chromatic dispersion compensated, but still with the frequency offset; a Phase Estimator unit 200 provides a phase shift $\Delta\hat{\omega}T$ and a Frequency offset estimator unit 17 provides an estimation value of frequency offset $\Delta\hat{\omega}$ to a Frequency offset compensation unit 100 to compensate the frequency offset through inverse rotation of the signal, the inverse rotation is implemented in time domain. For each signal sample, 4 real number multiplications, 3 additions, 1 modulo operation, 1 shifting operation need to be performed. The complex computation is a great burden to the receiver, and much resource needed when performing the computation.

A Phase Compensation unit 300 obtains the signal from the frequency offset compensation unit 100, performs the phase compensation, outputs the signal to a decision unit 18 to output signal needed.

Figure 2:
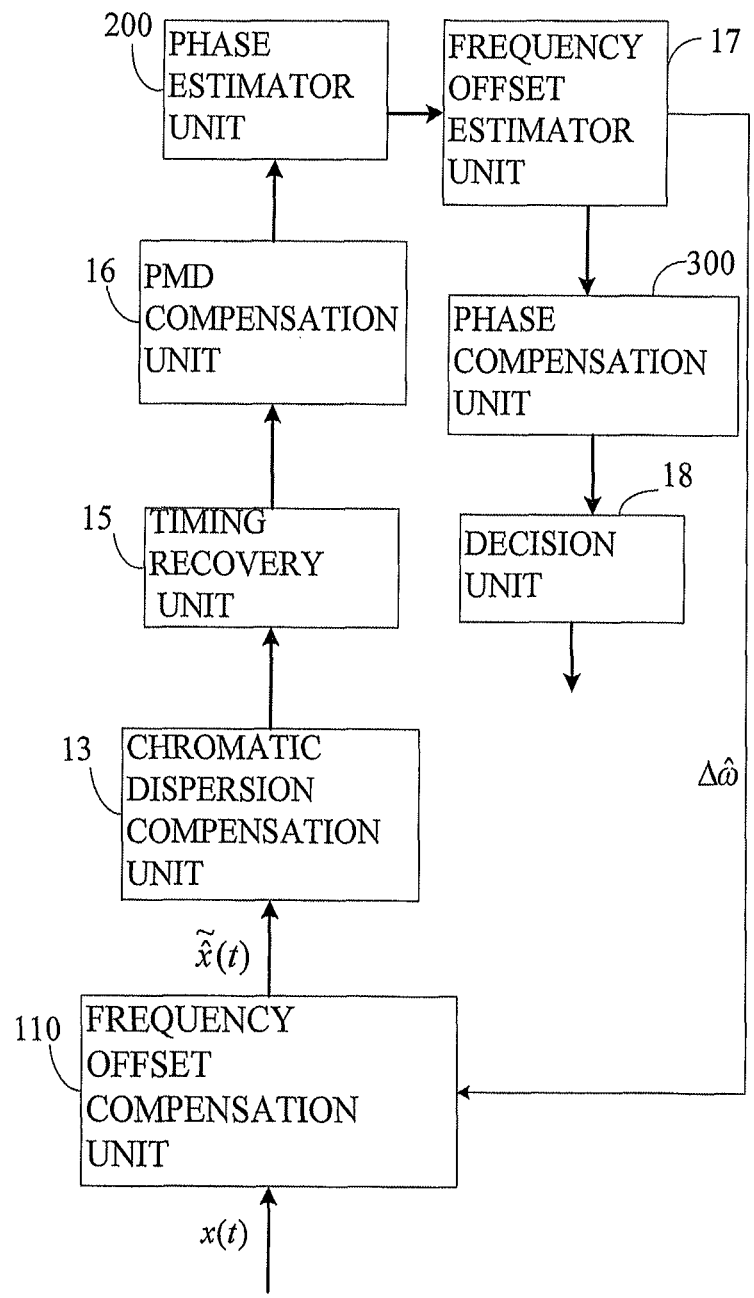
FIG. 2 is a structure diagram of an optical coherent receiver of an embodiment of the present invention.

FIG. 2 shows an embodiment of a structure diagram of a digital optical coherent receiver of the present invention. And a method for carrier frequency recovery is also disclosed therein.

Suppose the digital optical coherent receiver receives a down-converted signal with frequency offset, the signal is x(t), having the spectrum $X(\omega)$. The flow of the optical coherent receiver's process may be as following according to an embodiment of the present invention:

A frequency offset compensation unit 110 receives the signal x(t), performs frequency offset compensation in the frequency domain on the signal received according to an estimated value of the frequency offset to obtain the signal with frequency offset compensated, wherein the estimated value comes from a frequency offset estimator unit 17.

A Chromatic Dispersion Compensation unit 13 receives the signal with frequency offset compensated from the frequency offset compensation unit 110, performs chromatic dispersion compensation on the signal. The chromatic dispersion compensation may be performed in time domain or frequency domain. Later process of other units may remain unchanged.

Thus the frequency and chromatic dispersion are compensated simultaneously or consecutively, so that the impairments of frequency offset on the following blocks, like timing recovery 15, PMD compensation unit 16 etc. are eliminated. This will improve the over-all performance of the system.

Figure 3:
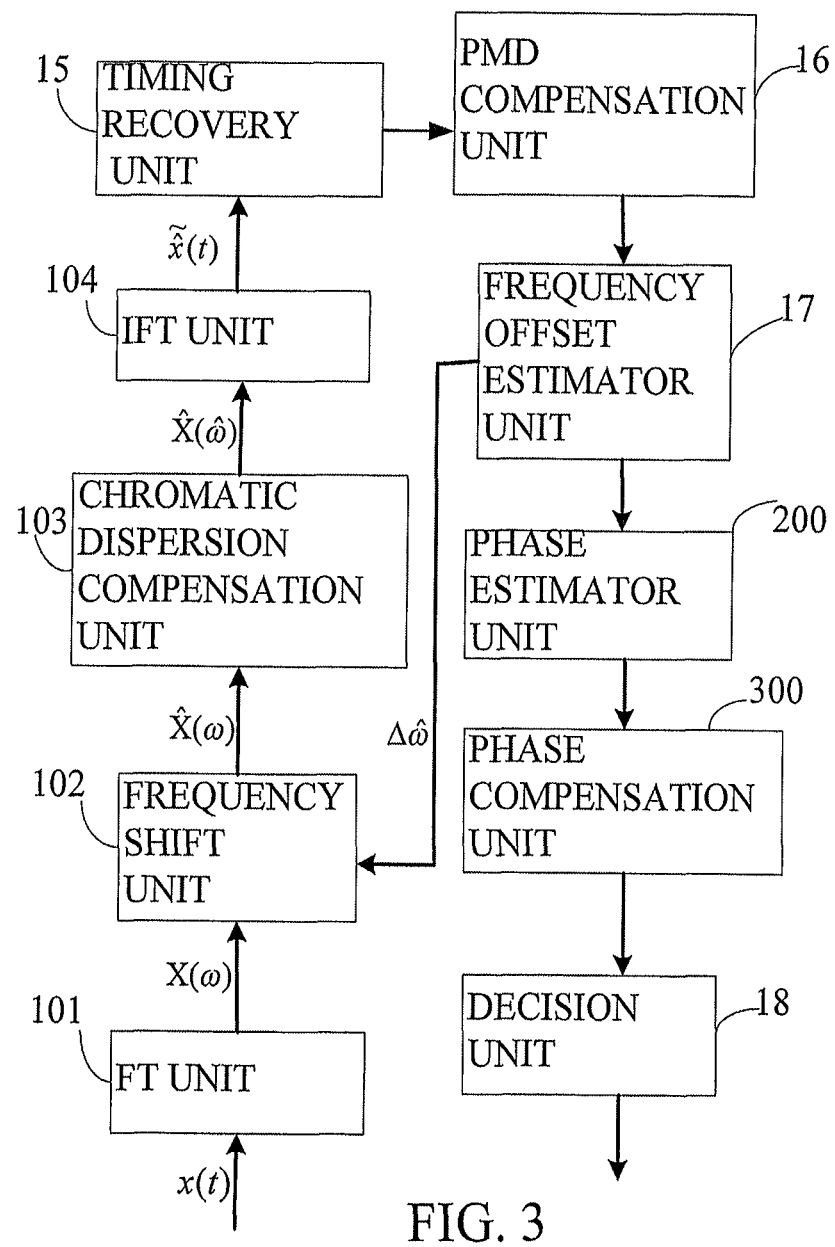
FIG. 3 is a structure diagram of an optical coherent receiver of another embodiment of the present invention.
Figure 4:
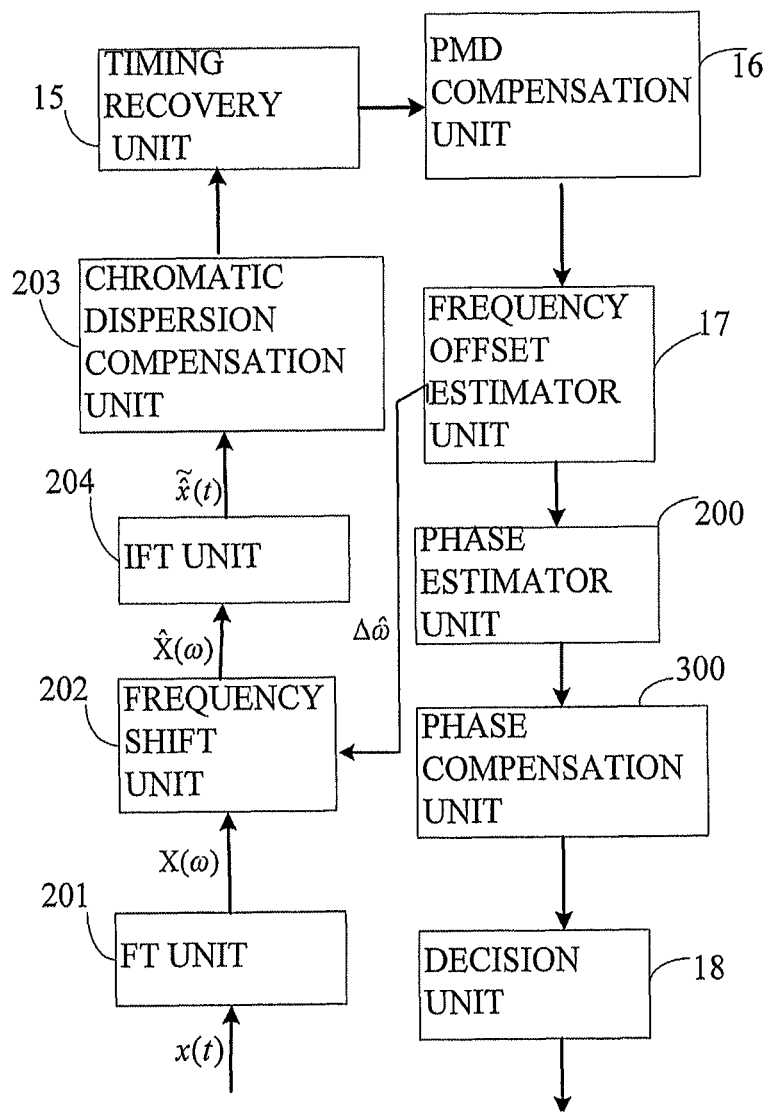
FIG. 4 is a structure diagram of an optical coherent receiver of another embodiment of the present invention.
Figure 5:
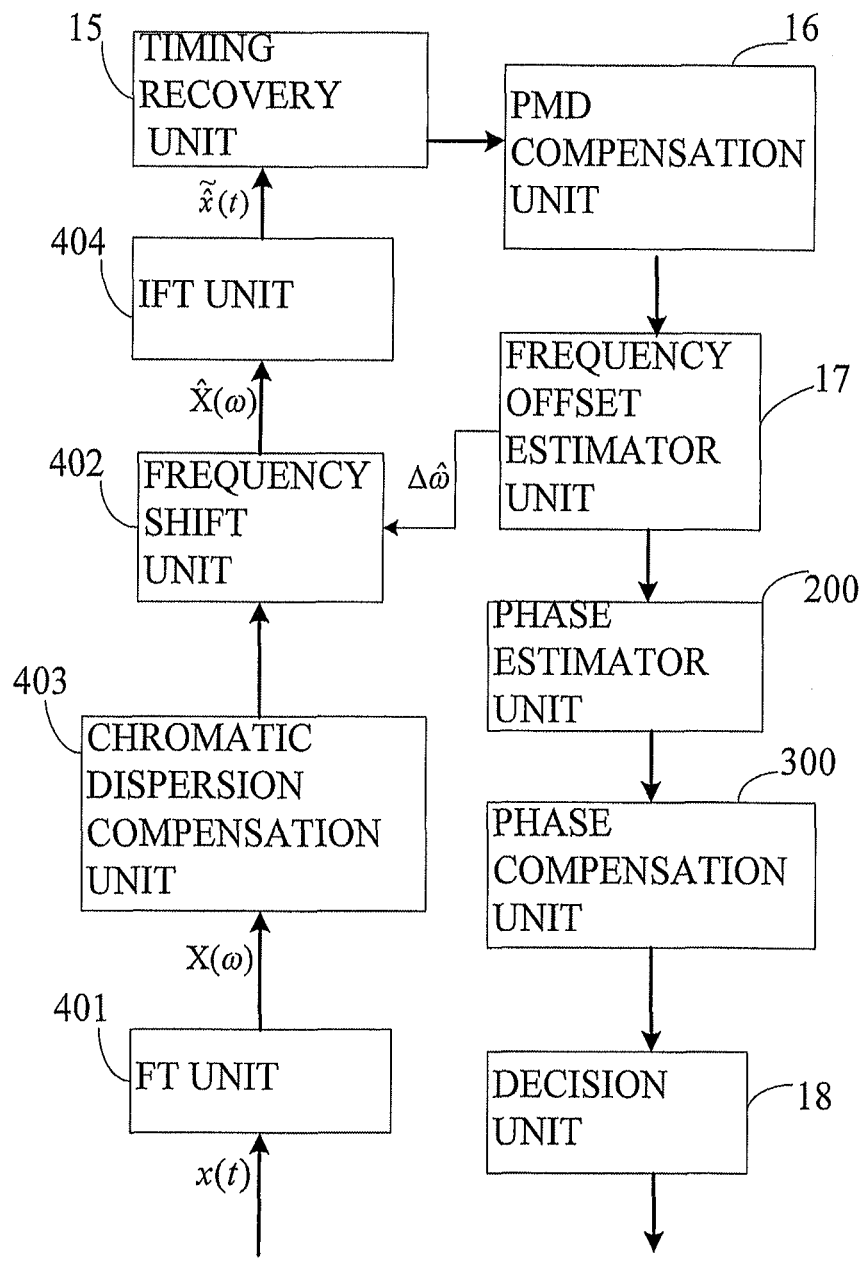
FIG. 5 is a structure diagram of an optical coherent receiver of another embodiment of the present invention.

FIGS. 3 to 5 shows embodiments of different combinations between frequency offset compensation unit and chromatic dispersion compensation unit in an optical coherent receiver of the present invention. And different method flows for carrier signal recovery is also disclosed by these embodiments and FIGS. 3 to 5 therein.

An embodiment of the present invention as shown in FIG. 3 may be described as following:

An FT unit 101, adapted to receive sampled signals and obtain spectrum of the signals, and carry out Fourier Transformation, FT, on x(t) to get spectrum $X(\omega)$ of the signal x(t). The signal x(t) is a sample signal output by an analogue/digital converter, ADC. The FT for example, may be Fast Fourier Transformation, FFT. Besides Fast Fourier Transform Algorithm, FFT, other Fourier Transforms Algorithm may also be adopted to implement the transformation between time domain and frequency domain.

A frequency shift unit 102, adapted to shift $X(\omega)$ according to an estimation of frequency offset $\Delta\hat{\omega}$ to get signal in frequency domain with frequency offset $\hat{X}(\omega)=X(\omega-\Delta\hat{\omega})$. The frequency offset is obtained from a feed-forward phase estimator.

A chromatic dispersion compensation unit 103, adapted to perform chromatic dispersion compensation on the signal from the frequency shift unit 102 by multiplying $\hat{X}(\omega)$ by a chromatic dispersion compensation function $H^{-1}(j\omega)=e^{-j\cdot\omega^2\beta_2 L/(8\pi^2)}$.

An IFT unit 104, adapted to carry out Inverse Fourier Transformation, IFT, on the signal obtained from the chromatic dispersion compensation unit 103 to obtain signal $\tilde{x}(t)$ with frequency offset compensated and chromatic dispersion compensated. Before being performed IFT, the signal may be $\hat{X}(\omega)H^{-1}(j\omega)$. The IFT may be Inverse Fast Fourier Transformation if the FT unit 101 carries out Fast Fourier Transformation.

The signal output to timing recovery unit 15 is both frequency offset compensated and chromatic dispersion compensated.

According to this embodiment, suppose we have a down-converted signal with frequency offset x(t), having the spectrum $X(\omega)$. Further, estimated frequency offset being $\Delta\hat{\omega}$, and phase shift at instant t being $\Delta\hat{\omega}t$. Then phase shift compensation may be described by $\hat{x}(t)=x(t)\cdot e^{-j\cdot\hat{\omega}\cdot t}$. According to the properties of FT, its spectrum may be represented by $\hat{X}(\omega)=X(\omega-\Delta\hat{\omega})$, which means just shifting the spectrum of x(t) by $\Delta\hat{\omega}$ delivers the spectrum of the compensated signal $\hat{x}(t)$. Therefore only a frequency shifting to the signal spectrum is needed, which reduced the computation complexity dramatically compared to traditional method thus the processing is speeded up and the needed resources are saved. Further, frequency and chromatic dispersion are compensated consecutively or simultaneously, so that the impairments of frequency offset on the following blocks, like timing recovery, PMD compensation etc. are eliminated greatly.

FIG. 4 shows another combination of chromatic dispersion compensation unit 203 and FT unit 201, IFT unit 204, and frequency shifting unit 202. Also FIG. 4 discloses the corresponding method flow. Chromatic dispersion compensation on the signal is performed after the signal is carried out by IFT. The frequency offset compensation is performed in frequency domain while the chromatic dispersion compensation is performed in time domain. From description above and with the help of FIG. 4, the person skilled in the art would derive without any difficulty the signal flow changes compare to FIGS. 2 to 3.

FIG. 5 shows another combination of chromatic dispersion compensation unit 403 and FT unit 401, IFT unit 404, and frequency shifting unit 402. The chromatic dispersion compensation is performed before shifting $X(\omega)$ according to an estimation of frequency offset $\hat{\Delta\omega}$ by the frequency shift unit 402, after carrying out Fourier Transformation, FT, on $x(t)$ to get spectrum $X(\omega)$ of the signal $x(t)$. Both frequency offset compensation and chromatic dispersion compensation are performed in the frequency domain. From description above and with the help of FIG. 5, the person skilled in the art would derive without any difficulty the signal flow changes compare to FIGS. 2 to 4.

Though illustration and description of the present disclosure have been given with reference to preferred embodiments thereof, it should be appreciated by persons of ordinary skill in the art that various changes in forms and details can be made without deviation from the scope of this disclosure being defined by the appended claims.

The invention claimed is:

1. A method for carrier frequency recovery in an optical coherent transmission system, in which at least one kind of equalization of a received signal is performed in frequency domain, the method comprising:
performing a frequency offset compensation in frequency domain on a received signal according to an estimated value of the frequency offset;
obtaining the signal with the frequency offset compensated; wherein
the equalization comprises both polarization mode dispersion compensation and chromatic dispersion compensation and wherein polarization mode dispersion compensation being performed after chromatic dispersion compensation.

2. The method of claim 1, wherein equalization is performed in frequency domain after shifting the received signal in frequency domain.

3. The method of claim 1, wherein the equalization comprises both polarization mode dispersion compensation and chromatic dispersion compensation and wherein polarization mode dispersion compensation being performed after chromatic dispersion compensation.

4. An optical coherent receiver, comprising:
an equalization unit, adapted to perform at least one kind of optical distortion compensation of a received signal in frequency domain;
a frequency offset compensation unit, adapted to perform the frequency offset compensation in frequency domain on a received signal according to an estimated value of the frequency offset to obtain the signal with frequency offset compensated;
wherein the equalization unit comprises both a polarization mode dispersion compensation unit and a chromatic dispersion compensation unit and wherein polarization mode dispersion compensation unit being adapted to perform polarization mode dispersion compensation after chromatic dispersion compensation has been performed.

5. The receiver of claim 4, further comprising:
a Fourier Transform, FT, unit, adapted to carry out Fourier Transform, FT, on the signal to obtain a first spectrum of the signal;
as frequency offset compensation unit a frequency shift unit, adapted to shift the first spectrum of the signal by the estimated value of the frequency offset to obtain a second spectrum of the signal in the frequency domain;
an Inverse Fourier Transform, IFT, unit (104, 204, 404), adapted to carry out an Inverse Fourier Transform, IFT, on the signal with the second spectrum.

6. The receiver of claim 5, wherein the equalization unit performs optical distortion compensation on the signal with the second spectrum before sending the signal to the IFT unit.

* * * * *